(12) United States Patent
Kichar et al.

(10) Patent No.: US 10,706,524 B2
(45) Date of Patent: Jul. 7, 2020

(54) SYSTEMS AND METHODS FOR ANALYZING STAINED FABRIC ARTICLES

(71) Applicant: Henkel IP & Holding GmbH, Duesseldorf (DE)

(72) Inventors: Paul Kichar, Oxford, CT (US); Maxime Pelletier, Sandy Hook, CT (US); Michelle Avelina Piombino, West Haven, CT (US); Joseph David Dahlmeyer, Jr., East Haven, CT (US)

(73) Assignee: Henkel IP & Holding GmbH (DE)

( * ) Notice: Subject to any disclaimer, the term of this patent is extended or adjusted under 35 U.S.C. 154(b) by 123 days.

(21) Appl. No.: 15/824,418

(22) Filed: Nov. 28, 2017

(65) Prior Publication Data

US 2019/0164274 A1    May 30, 2019

(51) Int. Cl.
| | |
|---|---|
| *G06T 7/00* | (2017.01) |
| *G06T 7/90* | (2017.01) |
| *G06T 7/586* | (2017.01) |
| *G01N 21/88* | (2006.01) |
| *G01N 21/94* | (2006.01) |

(52) U.S. Cl.
CPC ....... *G06T 7/0004* (2013.01); *G01N 21/8851* (2013.01); *G01N 21/94* (2013.01); *G06T 7/586* (2017.01); *G06T 7/90* (2017.01); *G06T 2207/10028* (2013.01); *G06T 2207/30124* (2013.01)

(58) Field of Classification Search
CPC ......... G06T 7/0004; G06T 7/586; G06T 7/90; G06T 2207/10028; G06T 2207/30124; G01N 21/8851; G01N 21/94

USPC .......................................................... 382/111
See application file for complete search history.

(56) References Cited

U.S. PATENT DOCUMENTS

| | | | | |
|---|---|---|---|---|
| 6,165,734 | A  * | 12/2000 | Garini | .................. C12Q 1/6841 |
| | | | | 435/14 |
| 2002/0110925 | A1* | 8/2002 | Mansky | ............... B01J 19/0046 |
| | | | | 436/180 |
| 2008/0088831 | A1* | 4/2008 | Mulders | .................... G01N 1/30 |
| | | | | 356/237.2 |

(Continued)

FOREIGN PATENT DOCUMENTS

| | | |
|---|---|---|
| GB | 2296261 A | 6/1996 |
| WO | 2017171651 A1 | 10/2017 |

OTHER PUBLICATIONS

Extended European Search Report EP 18 20 8485 Completed: Mar. 18, 2019; dated Mar. 25, 2019 7 pages.

*Primary Examiner* — Ali Bayat
(74) *Attorney, Agent, or Firm* — Bojuan Deng

(57) ABSTRACT

Systems and methods for analyzing stained fabric articles are provided herein. In an embodiment, a method for analyzing stained fabric articles includes providing a stained fabric article that includes a foreign oily substance disposed in and/or on the fabric article. At least one image of the stained fabric article is captured using a three-dimensional imaging device, wherein the at least one image is captured in the absence of a colored dyes added to the foreign oily substance in and/or on the fabric article. The at least one image is processed using a contrast function to produce a processed data set. One or more of a processed image or a quantitative data set that is representative of oily substance presence in the viewing area of the three-dimensional imaging device is produced based upon the processed data set.

17 Claims, 5 Drawing Sheets

(56) References Cited

U.S. PATENT DOCUMENTS

| | | | |
|---|---|---|---|
| 2009/0062172 A1* | 3/2009 | Cunningham | C11D 3/0084 |
| | | | 510/281 |
| 2009/0141928 A1 | 6/2009 | Armstrong | |
| 2011/0304705 A1* | 12/2011 | Kantor | A61B 5/0059 |
| | | | 348/49 |
| 2012/0015176 A1* | 1/2012 | Riebel | B32B 27/06 |
| | | | 428/323 |
| 2012/0139540 A1* | 6/2012 | Flood | D06F 39/00 |
| | | | 324/309 |
| 2012/0196375 A1* | 8/2012 | Granja | G01N 21/6428 |
| | | | 436/94 |

\* cited by examiner

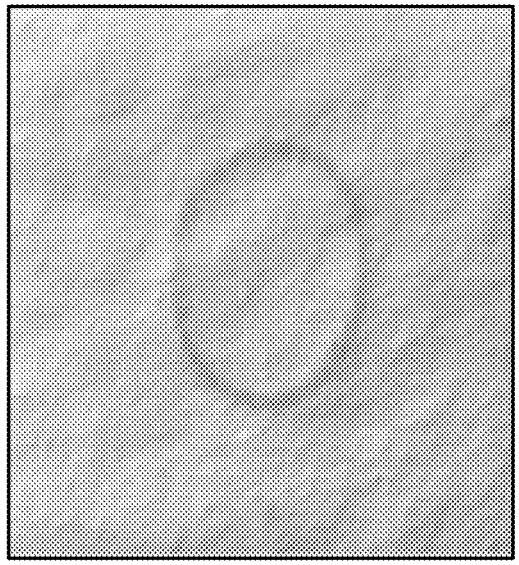 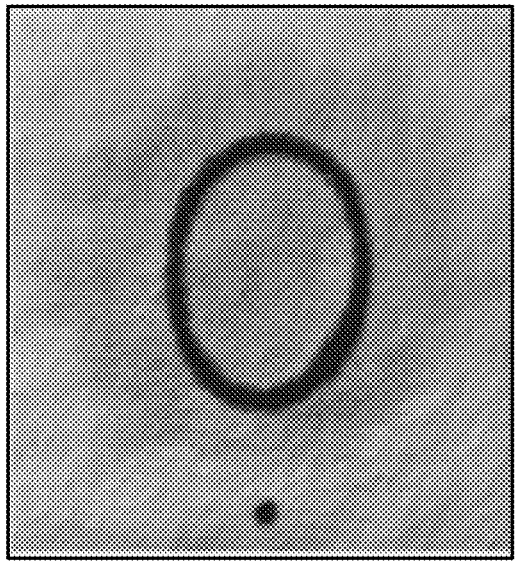
FIG. 2A  FIG. 2B
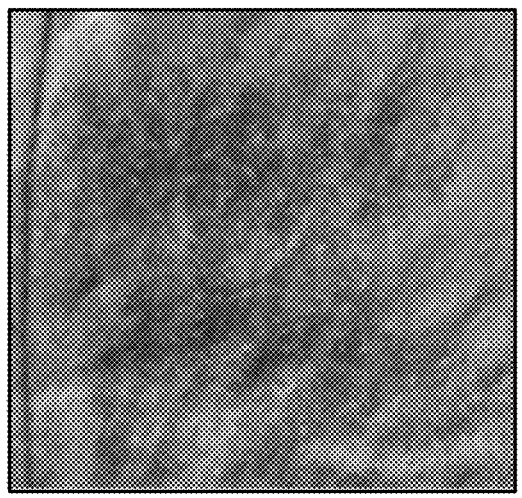 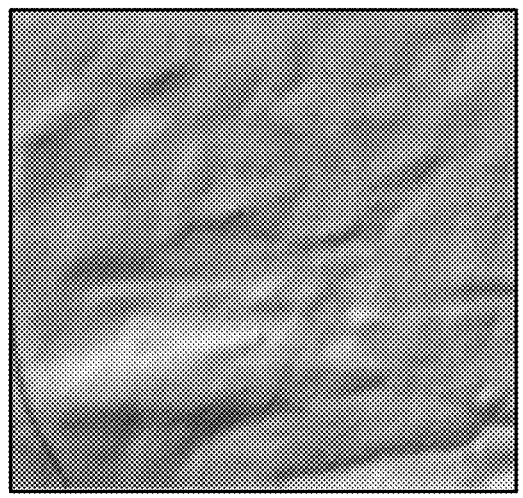
FIG. 3A  FIG. 3B

SYSTEMS AND METHODS FOR ANALYZING STAINED FABRIC ARTICLES

TECHNICAL FIELD

The technical field generally relates to systems and methods for analyzing stained fabric articles, and more particularly relates to systems and methods that exhibit enhanced visual and/or quantitative assessment of stain presence in stained fabric articles.

BACKGROUND

Manufacturers of fabric laundering compositions such as laundry detergents, fabric softening compositions, and detergent boosters continually endeavor to identify ideal fabric laundering compositions that are effective for removing various types of foreign substances from stained fabric articles. Human sebum is one type of oily substance that is often difficult to remove from fabrics, as are other oils derived from animal, vegetable, and/or petrochemical sources such as cooking oils and fats, fatty compounds employed in antiperspirant and deodorant compositions, and the like.

In conjunction with identifying ideal fabric laundering compositions that are effective for purposes of removing oily substances, it is also desirable to assess the stained fabric articles as well as effectiveness of the fabric laundering compositions to remove oily substances from the stained fabric articles. Conventionally, photographic images have been used to visually assess differences in stain distribution prior to and after laundering the stained fabric articles for purposes of determining effectiveness of the fabric laundering compositions. However, conventional cameras are ineffective at sufficiently detecting electromagnetic emissions from oily substances on the stained fabric articles. In particular, stains that include oily substances are often invisible stains, meaning that the stain only reflects light in portions of the electromagnetic spectrum that are either not visible to the human eye or that are not easily perceived by the bare human eye (e.g., with at least 95% of light reflected from the stain not visible to the human eye). To enable effective images of stained fabric articles to be captured using conventional cameras, both before and after laundering the stained fabric articles, colored dyes are typically employed. For example, Violet 13 dye is commonly used to dye cooking oils. Without the colored dyes, effective images taken with conventional cameras cannot be readily produced, even using photo manipulation software. Furthermore, conventional analysis of stained fabric articles and determination of effectiveness of fabric laundering compositions is generally limited to qualitative analysis, such as visual image comparison. While spectrophotometry is effective to quantify effectiveness of the fabric laundering compositions, such techniques do not lend themselves to expedient use.

Three-dimensional cameras have been developed for a variety of uses including, but not limited to, cartography, dermatology, and entertainment applications. One particular line of three-dimensional cameras has been developed by Miravex Ltd. of Dublin, Ireland and sold under the tradename Antera 3D®. The Antera 3D® camera was developed for cosmetic and dermatological applications and is effective for measuring human skin features such as wrinkles, texture, scars, skin color, redness, and pigmentation. In particular, the Antera 3D® camera is capable of processing captured images to measure melanin and hemoglobin levels in skin. Based upon the measurements made using the Antera 3D® camera, various cosmetic and/or medical procedures may be carried out.

Accordingly, it is desirable to provide systems and methods for analyzing stained fabric articles with enhanced visual and/or quantitative assessment of stain presence in the stained fabric articles. It is also desirable to provide systems and methods that enable effective visual and/or quantitative analysis of the stained fabric articles in the absence of a colored dye, even when the stain is invisible or difficult to perceive with the human eye. It is also desirable to provide systems and methods that enable effective visual and/or quantitative analysis of the stained fabric articles in an expedient manner. Furthermore, other desirable features and characteristics will become apparent from the subsequent detailed description and the appended claims, taken in conjunction with the accompanying drawings and this background.

BRIEF SUMMARY

Systems and methods for analyzing stained fabric articles are provided herein. In an embodiment, a method for analyzing stained fabric articles includes providing a stained fabric article that includes a foreign oily substance disposed in and/or on the fabric article. At least one image of the stained fabric article is captured using a three-dimensional imaging device, wherein the at least one image is captured in the absence of a colored dye added to the foreign oily substance in and/or on the fabric article. The at least one image is processed using a contrast function to produce a processed data set. One or more of a processed image or a quantitative data set that is representative of oily substance presence in a viewing area of the three-dimensional imaging device is produced based upon the processed data set.

In another embodiment, a method for analyzing stained fabric articles includes providing a stained fabric article that includes a foreign oily substance disposed in and/or on the fabric article. A plurality of images of the stained fabric article are captured using a three-dimensional imaging device. The plurality of images have different spatial properties and the plurality of images are of a substantially similar viewing area of the three-dimensional imaging device. One or more of a composite image is produced based upon the plurality of images or a quantitative data set representative of oily substance presence in a viewing area of the three-dimensional imaging device is produced based upon the plurality of images.

In another embodiment, a system for analyzing stained fabric articles is provided. The system includes a stained fabric article that includes a foreign oily substance disposed in and/or on the fabric article. The system further includes a three-dimensional imaging device. The three-dimensional imaging device is configured to capture images through a photometric stereo technique.

BRIEF DESCRIPTION OF THE DRAWINGS

The patent or application file contains at least one drawing executed in color.

The various embodiments will hereinafter be described in conjunction with the following drawing figures, wherein like numerals denote like elements, and wherein:

FIG. 2a is a comparative photograph of a stained fabric article stained with butter prior to laundering, representing a view akin to the perception by the human eye and with the stain being effectively invisible;

FIG. 2b is a photograph of the same area of the stained fabric article of FIG. 2a captured using an Antera 3D® camera and after applying the contrast function;

FIG. 3a is a photograph of a stained fabric article stained with a deodorant/antiperspirant composition prior to laundering using the Antera 3D® camera and after applying the contrast function;

FIG. 3b is a photograph of the same area of the stained fabric article of FIG. 3a after soaking the stained fabric article in a composition including a detergent booster that contains a bleaching agent, captured using the Antera 3D® camera and after applying the contrast function;

DETAILED DESCRIPTION

Figure 1:
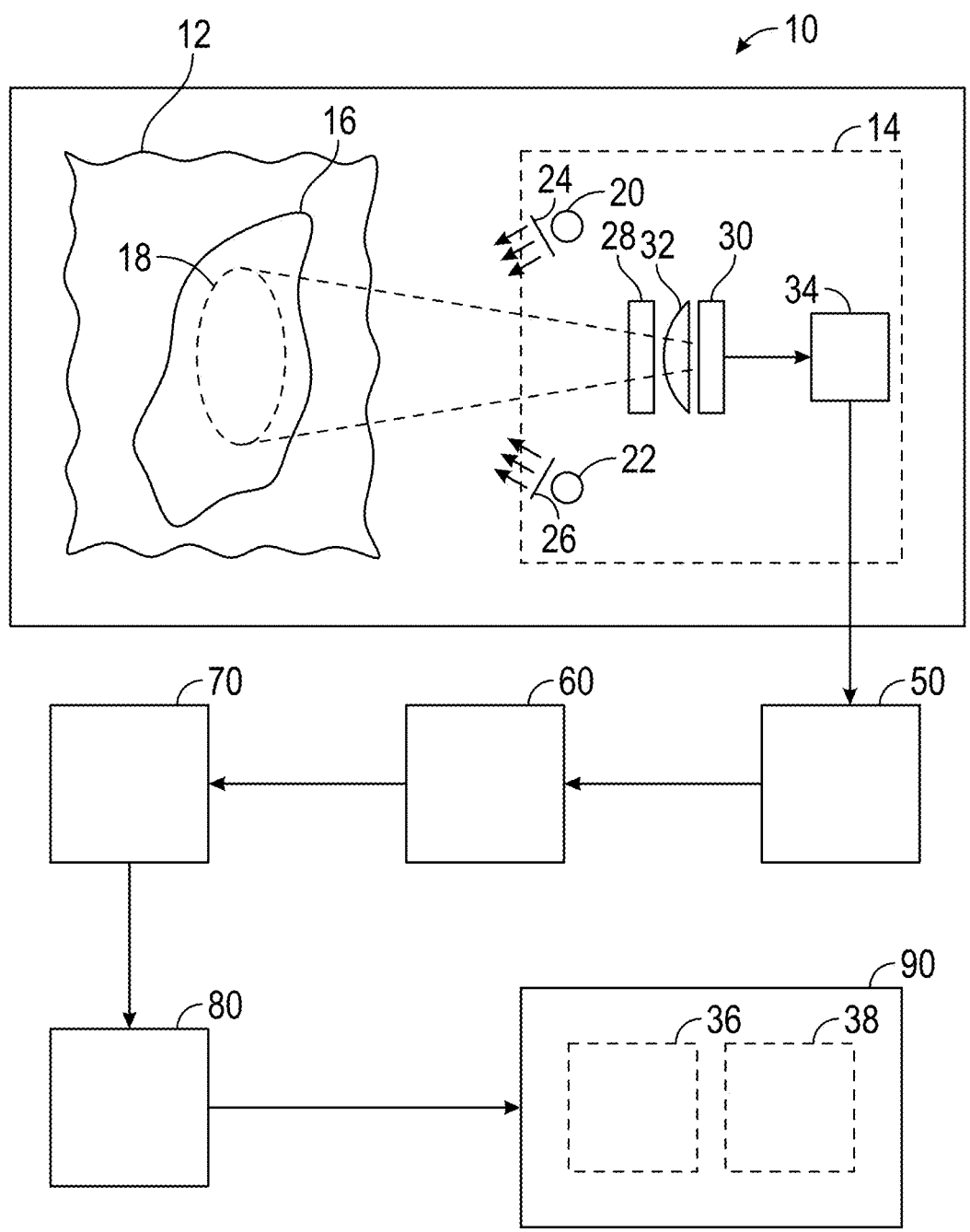
FIG. 1 schematically illustrates a system and method for analyzing a stained fabric article in accordance with an embodiment.

The following detailed description is merely exemplary in nature and is not intended to limit the systems and methods for analyzing stained fabric articles as described herein. Furthermore, there is no intention to be bound by any theory presented in the preceding background or the following detailed description.

Systems and methods for analyzing stained fabric articles are provided herein. In particular, the systems and methods employ a three-dimensional imaging device to capture at least one image of the stained fabric article, and a plurality of images may be captured using the three-dimensional imaging device. As set forth in further detail below, the three-dimensional imaging devices as described herein are not necessarily employed to produce images representing a three-dimensional shape of a surface of the stained fabric articles. However, it was found that the three-dimensional imaging devices, through their mode of operation, effectively produce enhanced images and/or quantitative data sets representative of oily substance in and/or on the stained fabric articles as compared to conventional cameras. The oily substance may be an invisible stain, i.e., any oily substance that reflects light in portions of the electromagnetic spectrum that are not visible to the human eye. In embodiments, the invisible stain only reflects light in portions of the electromagnetic spectrum that are not visible to the human eye. In other embodiments, at least 95% of electromagnetic radiation reflected from the stain is in portions of the electromagnetic spectrum that are not visible to the human eye, thereby making the stain difficult to perceive by the human eye and effectively "invisible". In embodiments, the three-dimensional imaging device may process the at least one image using a contrast function to produce a processed data set, with the resulting data set exhibiting enhanced contrast between areas in the fabric article containing the stain and clean areas of the fabric article. By using the contrast function, which is conventionally employed by the three-dimensional cameras to register depth of an imaged surface, it is possible (although not necessary) to capture the at least one image with effective distinction between stained areas and clean areas in the absence of a colored dye added to the foreign oily substance on the fabric article, even when the foreign oily substance is an invisible stain that is not visible to or difficult to perceive by the human eye. Because the contrast function is readily conducted using the at least one image captured by the three-dimensional imaging device, visual and/or quantitative assessment of stain presence can be enhanced without requiring spectrophotometers.

An embodiment of a system and method for analyzing stained fabric articles will now be described with reference to FIG. 1. The system 10, as referred to herein, includes devices and materials that contribute to production of an image and/or quantitative data set representative of oily substance in and/or on the stained fabric articles. In this regard, an exemplary system 10 includes a stained fabric article 12 and a three-dimensional imaging device 14, although it is to be appreciated that the system 10 may further include additional optional devices and/or materials that are employed to yield the desired image and/or quantitative data set.

As alluded to above, the stained fabric article 12 includes the oily substance 16 in and/or on the stained fabric article 12. In particular, the oily substance 16 is a foreign oily substance that is unintended to be present in and/or on the fabric article 12, with the foreign oily substance 16 desirably removed during laundering. In embodiments, the oily substance 16 includes an oil derived from animal, vegetable, and/or petrochemical sources, and it is to be appreciated that a combination of such oils may be present in the oily substance 16. Examples of oily substances include mono- and/or polyunsaturated fat. Specific examples of oily substances include, but are not limited to, antiperspirant and deodorant compositions, human sebum, synthetic sebum, and cooking oils and fats such as butter, canola oil, and the like. It is also to be appreciated that additional components beyond the oil may be present in the oily substance 16. In embodiments, the systems and methods described herein are employed in a controlled environment where a standardized oily substance 16 is employed to stain the fabric article 12 for purposes of assessing stain removal effectiveness of various detergents, detergent boosters, fabric conditioners, or the like. Thus, in embodiments, standardized testing compositions may be employed as the oily substance 16. For example, the oily substance 16 may be a synthetic sebum composition such as those commercially available from Testgewebe GmbH of Brueggen, Germany. Other suitable standardized oily substances can include commercially available antiperspirant and deodorant compositions that include one or more mono- and/or polyunsaturated fats. For example, a suitable antiperspirant and deodorant composition that may be employed for testing purposes is Speed Stick Power Unscented Antiperspirant and Deodorant stick.

The three-dimensional imaging device 14 may be any imaging device that is capable of capturing and producing images and/or quantitative data sets representing a three-dimensional shape of a surface in a viewing area 18 of the imaging device 14. In accordance with the present disclosure, the three-dimensional imaging device 14 is a commercially available imaging device, and new imaging devices 14 are not contemplated by the present disclosure. Thus, while suitable three-dimensional imaging devices 14 are described herein, it is to be appreciated that various features and operation of the imaging devices 14 are endemic to the three-dimensional imaging device 14 as obtained from the manufacturer of the imaging device 14.

As alluded to above, the three-dimensional imaging devices 14 are not necessarily employed to produce images representing a three-dimensional shape of a surface of the stained fabric articles 12 in accordance with the methods described herein. However, it was found that the three-dimensional imaging devices 14, through their mode of operation, effectively produce images and/or quantitative data sets representative of oily substance 16 in and/or on the stained fabric articles 12, even when the oily substance 16 is an invisible stain that is not visible to the human eye or that is difficult to perceive by the human eye, through application of contrast functions that would ordinarily be employed to register depth of the surface in the viewing area 18 of the imaging device 14. Various three-dimensional imaging devices are known that operate through different methodologies to capture and represent the three-dimensional shape of the surface in the viewing area. In various embodiments, the three-dimensional imaging devices 14 capture a plurality of images in such a manner that the images have different spatial properties. For example, three-dimensional imaging devices (not shown) are known that employ a "binocular stereo" technique by which a plurality of images of a substantially similar viewing area are captured by the imaging device from different viewpoints but with a static illumination angle to produce the images having different spatial properties. A depth of the surface is recovered by identifying corresponding points in the two images using software executed by a processor of the imaging device. As another example and referring to FIG. 1, three-dimensional imaging devices 14 are also known that are configured to capture images through a "photometric stereo" technique. In the photometric stereo technique, a plurality of images of a substantially similar viewing area 18 are captured by the imaging device 14 with a different illumination direction for each of the plurality of images with a constant viewing direction or viewpoint to produce the images having different spatial properties.

Referring again to FIG. 1, in embodiments, the three-dimensional imaging device 14 includes a plurality of separate illumination source 20, 22, such as light emitting diodes (LEDs), that are positioned to illuminate the viewing area 18 of the imaging device 14 at different angles for purposes of capturing images through the photometric stereo technique. While only two illumination sources 20, 22 are shown in FIG. 1, it is to be appreciated that a number of additional illumination sources may be employed. In this embodiment, the imaging device 14 further includes an image sensor 30 and one or more lenses 32 positioned to focus images on the image sensor 30. In embodiments, the three-dimensional imaging device 14 may include an arrangement of filters 24, 26, and/or 28 that are configured to minimize capture of specular reflection. For example, in embodiments and as shown in FIG. 1, the filters 24, 26, and/or 28 may be polarization filters that are positioned between the illumination source(s) 20, 22 and the surface in the viewing area 18 of the imaging device 14 and/or between the image sensor 30 and the surface in the viewing area 18 of the imaging device 14. The various filters 24, 26, 28 may be configured to filter electromagnetic radiation of predetermined intensity and/or wavelength prior to capturing an image of the surface in the viewing area 18 using the image sensor 30. Although not shown, it is to be appreciated that the imaging device 14 may further include additional elements, such as features for shaping the illumination (e.g., light condensers and/or diffusers), additional polarization filters, imaging apertures, and other features that are conventional within three-dimensional imaging devices. In one specific embodiment, the three-dimensional imaging device 14 is an Antera 3D® camera, commercially available from Miravex of Dublin, Ireland.

As also shown in FIG. 1, the three-dimensional imaging device 14 further includes a computer processor 34 that is configured to process at least one image captured by the three-dimensional imaging device 14 using a contrast function. The contrast function is described in further detail below. An output produced using the contrast function as applied by the computer processor 34 to process the at least one image is provided by the imaging device 14. For example, in various embodiments, the output may be a processed image or a quantitative data set representative of oily substance presence in the viewing area 18 of the three-dimensional imaging device 14. Additional details in this regard are provided in further detail below in the context of an exemplary method of analyzing stained fabric articles.

In accordance with an exemplary embodiment of a method of analyzing stained fabric articles, and with continued reference to FIG. 1, a stained fabric article 12 is provided that includes an oily substance 16 disposed in and/or on the fabric article 12. As set forth above, the systems and methods described herein are employed in a controlled environment where a standardized oily substance is employed to stain the fabric article 12 for purposes of assessing stain removal effectiveness of various detergents, detergent boosters, fabric conditioners, or the like. Thus, the stained fabric article 12 may be provided as a test material with a standardized amount of oily substance 16 and/or distribution of the oily substance 16 on the stained fabric article 12. In embodiments, oily substance 16 is an invisible stain that is not visible to the human eye. In other embodiments, at least 95% of electromagnetic radiation reflected from the stain is in portions of the electromagnetic spectrum that are not visible to the human eye, thereby making the stain difficult to perceive by the human eye. At least one image of the stained fabric article 12 is captured using the three-dimensional imaging device 14. In accordance with an exemplary embodiment, a plurality of images of a substantially similar viewing area 18 on the surface of the stained fabric article 12 are captured using the three-dimensional imaging device 14, with the plurality of images having different spatial properties lending to illumination of the viewing area 18 with a different illumination direction for each of the images. By "different illumination direction", it is meant that varying levels of illumination intensity and/or illumination configurations are employed using the illumination sources 20, 22 to effectively provide different illumination conditions for each captured image. While FIG. 1 illustrates illumination sources 20, 22 simultaneously emitting illumination, in practice, it is to be appreciated that only one of the illumination sources 20, 22 may emit illumination for each captured image. Alternatively, more than one illumination source 20, 22 may be illuminated for each captured image but with different illumination intensities employed for each captured image. It is to be appreciated that while only two illumination sources 20, 22 are shown in FIG. 1, numerous additional illumination sources may be employed with varying levels of illumination intensity and illumination configurations employed to provide the plurality of captured images with a different illumination direction for each of the images.

In embodiments, electromagnetic radiation of predetermined intensity and/or wavelength is filtered, e.g. using the arrangement of filters 24, 26, 28, prior to capturing the images using the image sensor 30. In embodiments, electromagnetic radiation that is attributable to specular reflection from the viewing area 18 is filtered using the arrangement of filters 24, 26, 28, with filtering conducted through conventional operation of the three-dimensional imaging device 14, such as the Antera 3D® camera.

As alluded to above, the at least one captured image is processed using a contrast function to produce a processed data set. As also set forth above, the three-dimensional imaging device 14 may be a commercial product. Thus, execution of the contrast function may proceed based upon programmed function from the manufacturer of the imaging device 14 with the imaging device 14 operated in a conventional manner but with images taken of the stained fabric article 12 as opposed to other articles. In embodiments, the contrast function is executed by the computer processor 34 to generate a visual contrast between areas of high light absorbance of light from the illumination source(s) 20, 22 and areas of low/no absorbance of light from the illumination source(s) 20, 22. For example, in embodiments, the illumination source(s) 20, 22 emits light in a plurality of specific wavelengths that include the entire visible spectrum from UV to IR wavelengths. Radiation from the illumination source(s) 20, 22 penetrates to different depths within the fabric, and oily substances 16 absorb a portion of the radiation in amounts proportional to concentration of the oily substances 16 in accordance with Beers Law. The computer processor 34 produces spectral curves that are based upon a degree of absorbance at each wavelength emitted by the illumination source(s) 20, 22. The spectral curves are used to calculate tristimulus values XYZ and L*a*b* color values. This calculation may be performed for each pixel within the camera's field of view. Based upon differences between areas of high absorbance and areas of low/no absorbance, the visual contrast may be generated. Optionally, electromagnetic radiation of predetermined intensity and/or wavelength is filtered prior to generating the visual contrast. In this manner, enhanced contrast between stained areas of the stained fabric article 12 and clean areas of the stained fabric article 12 can be achieved. Such enhanced contrast can even be realized under conditions in which the at least one image is captured in the absence of a colored dye added to the foreign oily substance 16 on the fabric article 12, with the foreign oily substance 16 being an invisible stain or a stain that is difficult to perceive by the human eye. Referring momentarily to FIGS. 2a and 2b, representative images are shown of an exemplary stained fabric article, with FIG. 2a representing a view akin to the perception by the human eye (and with the stain being effectively invisible) and with FIG. 2b representing a view captured using the three-dimensional imaging device 14 and after applying the contrast function. Notably, while known three-dimensional imaging devices 14 are designed and configured for capturing contours and surface topography of three-dimensional structures, the above-referenced functionality and abilities to enhance contrast for the benefit of perceiving stains, specifically invisible stains, on fabrics has not been recognized or suggested.

Figure 5:
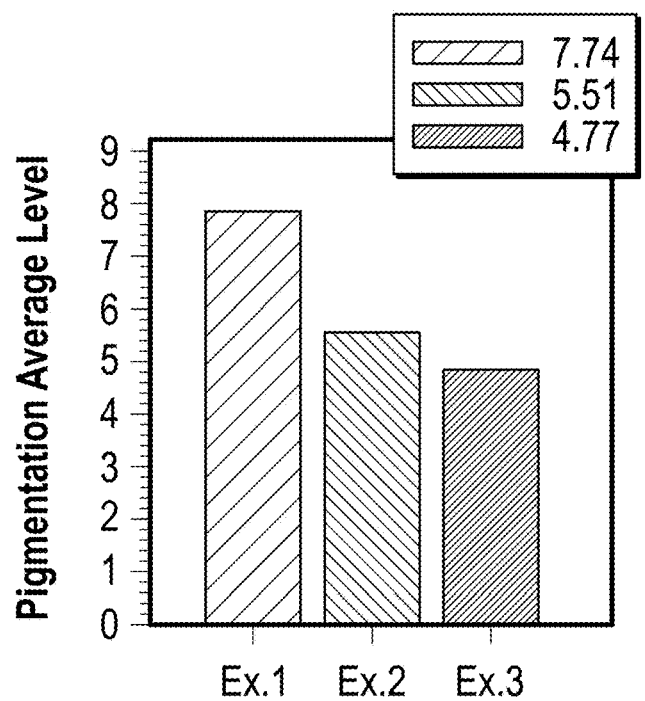
FIG. 5 is a table illustrating Pigment Average Level values for the stained fabric articles of FIGS. 4d-4f obtained as output using the Antera 3D® camera.
Figure 6:
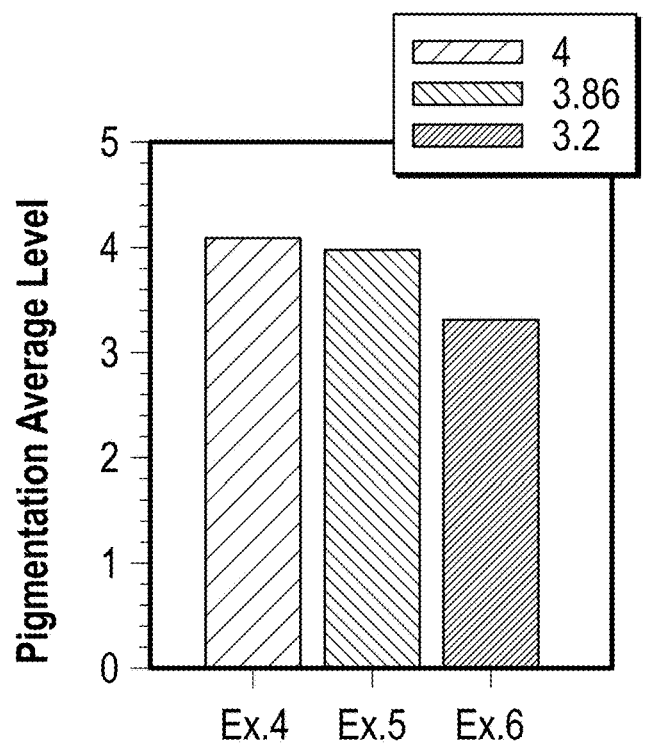
FIG. 6 is a table illustrate Pigment Average Level values for additional stained fabric articles stained with canola oil after laundering under different conditions, with the Pigment Average Levels obtained as output using the Antera 3D® camera.

The three-dimensional imaging device 14 may produce a variety of outputs that are useful for purposes of analyzing stained fabric articles 12, with the outputs represented by box 50 in FIG. 1. For example, in embodiments, one or more of a processed image or a quantitative data set that is representative of oily substance presence in the viewing area 18 of the three-dimensional imaging device 14 are produced based upon the processed data set. Representative processed images are shown in FIGS. 2b-4f. Representative quantitative data sets are shown in FIGS. 5 and 6. For example, in embodiments, the processed images may be composite images based upon the generated visual contrast. However, it is to be appreciated that the composite images may be based upon various alternative determinations made across the plurality of captured images. As another example, in embodiments, the quantitative data sets that are representative of oily substance presence in the viewing area 18 of the three-dimensional imaging device 14 are produced based upon the processed data set, either in addition to or as an alternative to the processed images. The type of quantitative data produced by the imaging device 14 is dependent upon the capabilities of the imaging device 14, which is a commercial product for purposes of the present disclosure as set forth above. In embodiments, such as for the Antera 3D® camera, the quantitative data set may include a pigmentation average level value that is based upon the processed data set. As another example, the quantitative data set may include values representative of distribution of pigment.

In embodiments, further processing of the stained fabric article 12 may be conducted for purposes of determining laundering effectiveness, with subsequent analysis of the stained fabric article 12 conducted using the three-dimensional imaging device 14 after laundering. More particularly, in embodiments and as represented by box 60 in FIG. 1, the stained fabric article 12 is laundered after capturing the at least one image of the stained fabric article 12 using the three-dimensional imaging device 14 to produce a laundered article. As represented by box 70, at least one image of the laundered article is captured using the three-dimensional imaging device 14. As also represented by box 70 in FIG. 1, the at least one image of the laundered article is processed using the contrast function to produce a processed data set of the laundered article, represented as an output in box 80. It is to be appreciated that image capture and processing represented by box 70 can be conducted using the three-dimensional imaging device 14 in the same manner as described above, with images taken of the substantially same area of the stained fabric article 12 both before and after laundering for purposes of analyzing laundering effectiveness. One or more of a processed image or a quantitative data set representative of oily substance presence in the viewing area of the image sensor 30 of the three-dimensional imaging device 14 may be produced based upon the processed data set of the laundered article for purposes of comparison to the corresponding outputs for the stained fabric article 12 procured prior to laundering. In embodiments and as shown at box 90 in FIG. 1, the output of the three-dimensional imaging device 14 from the fabric article 12, both prior to and after laundering, may be displayed to provide a basis for comparison of laundering effectiveness.

For example, in one embodiment, the processed image 38 based upon the processed data set of the laundered article and the processed image 36 based upon the processed data set of the stained fabric article 12 may be displayed to provide the basis of comparison. Such images may not only be used for internal analysis of the stained fabric article 12, but may also be employed for marketing purposes. As another example, the quantitative data set based upon the processed data set of the laundered article and the quantitative data set based upon the processed data set of the stained fabric article 12 may be displayed in a common illustration, in addition to or as an alternative to displaying the processed images, with examples of such illustrations shown in FIGS. 5 and 6.

Further data manipulation may be conducted based upon the quantitative data sets produced by the three-dimensional imaging device 14 for the fabric articles before and after laundering. For example, Stain Removal Index (SRI) values can be calculated based upon the quantitative data sets produced by the three-dimensional imaging device 14 for purposes of further determining laundering effectiveness, and statistical analysis can also be conducted using conventional techniques.

The following Examples are intended to supplement the present disclosure and are not to be interpreted as limiting the subject matter as contemplated herein.

EXAMPLES

Various stained and unstained fabric samples were provided with different soiling materials.

For the fabric samples, 100% knit cotton were employed, as were consumer-provided garments of unknown specific fabric type. The following soiling materials were either applied using a micropipette to produce stained fabric samples, or the fabric samples were obtained directly from consumers with the soiling material already disposed on the fabric samples (in the case of consumer-provided garments):
Stained Fabric Sample 1: 100% cotton fabric stained with butter;
Stained Fabric Sample 2: consumer-provided garment stained with a deodorant/antiperspirant composition of unknown specific composition;
Stained Fabric Sample 3: 100% cotton fabric stained with extra virgin olive oil;
Stained Fabric Sample 4: 100% cotton fabric stained with canola oil.

Images of the fabric samples were captured using an Antera 3D® camera, commercially available from Miravex Ltd. of Dublin, Ireland, for purposes of visualizing and quantifying the presence of the soiling materials, with various images captured prior to and after washing the samples of fabrics under different wash conditions, and with images shown before and after processing the images using a contrast function of the Antera 3D® camera.

For wash processing, a Speed Queen top loading traditional washing machine was used with non-chlorinated water at a water temperature of about 32.2° C. Various laundry detergents were used in different wash processes with conventional laundry detergent dosages employed. The water was added and agitated for 1 minute prior to adding about 2.5 kg of fabric material. The fabric material was washed in a 12 minute wash cycle and a conventional rinse cycle.

Pigmentation data was generated by the Antera 3D® camera using a proprietary algorithm contained in software of the camera for purposes of providing a quantitative data set representative of stain presence in the fabric samples. The pigmentation data is generated based upon the images of the fabric samples as captured by the Antera 3D® camera, with the pigmentation data representing an average concentration of soiling material relative to a viewing area of the camera. The pigmentation data was based upon substantially similar areas of the fabric samples in the viewing area of the camera.

In a first set of Examples and referring to FIGS. 2a and 2b, Stained Fabric Sample 1 was provided. The images of FIGS. 2a and 2b illustrate how the Antera 3D® camera enhances stain visualization using the contrast function. In particular, FIG. 2a is an image of Stained Fabric Sample 1 prior to applying the contrast function and after laundering the Stained Fabric Sample 1 using conventional laundry detergent, effectively representing an image of the Stained Fabric Sample 1 after laundering akin to perception with the human eye. FIG. 2b is an image of the same portion of Stained Fabric Sample 1 as shown in FIG. 2a, but after applying the contrast function of the Antera 3D® camera. For FIGS. 2a and 2b, an ink ring was stamped on the fabric to indicate the location of the stain, since the stain itself is not visible in FIG. 2a. The ink ring is not part of the stain. These figures illustrate the effect of applying the contrast function and show the butter stain clearly visible for qualitative/quantitative assessment after applying the contrast function.

Referring to FIGS. 3a and 3b, photographs of Stained Fabric Sample 2 are shown prior to laundering (in FIG. 3a) and after soaking the stained fabric sample in composition including a detergent booster that contains a bleaching agent (in FIG. 3b), with both photographs showing images after applying the contrast function of the Antera 3D® camera for purposes of showing that differences in pre-laundering and post-soaking stain content can be distinguished in accordance with the methods and systems as described herein. To prepare the Stained Fabric Sample 2 as shown in FIG. 3b, the sample was soaked in a 1 gallon bucket containing the detergent booster for 3 hours.

Figure 4C:
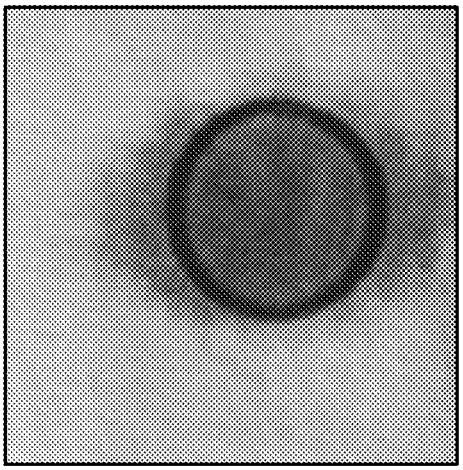
FIGS. 4a-4c are photographs of stained fabric articles stained with olive oil prior to laundering using the Antera 3D® camera and after applying the contrast function.
Figure 4F:
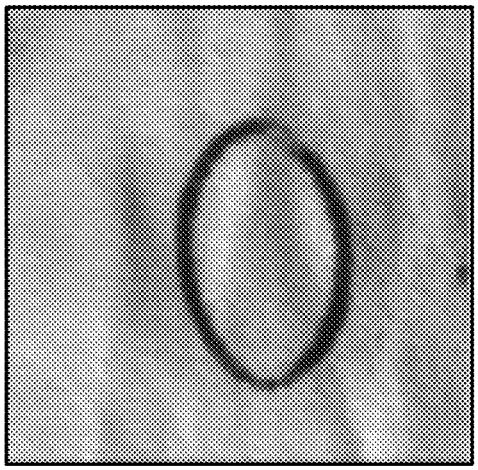
FIGS. 4d-4f are photographs of stained fabric articles corresponding to FIGS. 4a-4c, respectively, after laundering under different conditions, with the photographs taken using the Antera 3D® camera and after applying the contrast function.
Figure 4B:
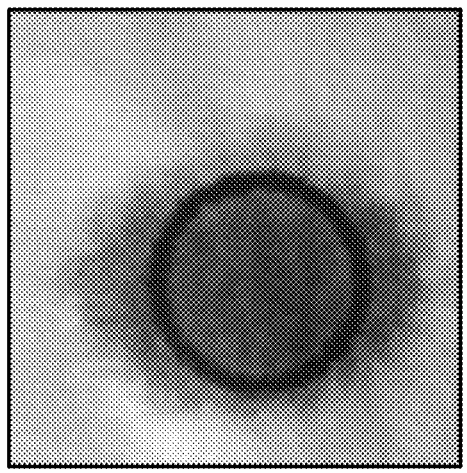
Figure 4E:
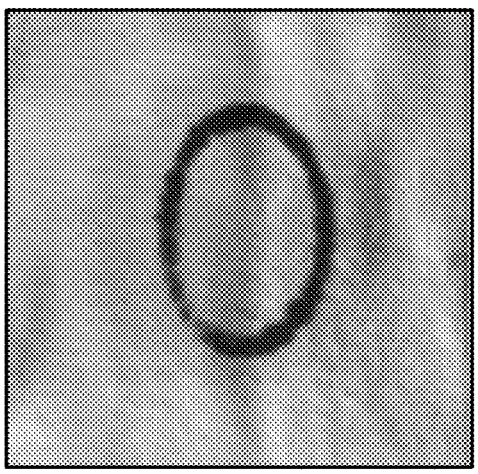
Figure 4A:
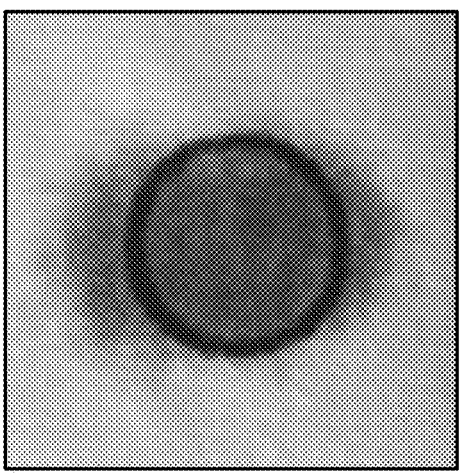
Figure 4D:
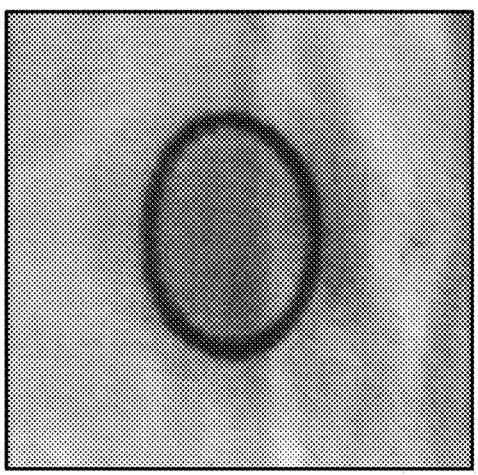

Referring to FIGS. 4a-4f, photographs of Stained Fabric Sample 3 are shown prior to laundering (in FIGS. 4a-4c) and after laundering (in FIGS. 4d-4f), with different laundering conditions used for purposes of showing that differences in laundering effectiveness can be distinguished in accordance with the methods and systems as described herein. All of FIGS. 4a-4f show images after applying the contrast function of the Antera 3D® camera. FIGS. 4a and 4d represent pre- and post-laundering images of Example 1, respectively, in which water alone is employed during laundering with no detergent. FIGS. 4b and 4e represent pre- and post-laundering images of Example 2, respectively, in which a conventional, premium laundry detergent was used during laundering. FIGS. 4c and 4f represent pre- and post-laundering images of Example 3, respectively, in which a conventional, super-premium laundry detergent with enzymes was used during laundering. It is to be appreciated that, fundamentally, the images of FIGS. 4a-4f are provided to show that differences in laundering effectiveness can be distinguished in accordance with the methods and systems as described herein and the specific detergents used are not material but are merely different.

FIG. 5 illustrates pigmentation average level representing an average concentration of soiling material for Examples 1-3, corresponding to the photographs of Examples 1-3 from FIGS. 4d-4f, respectively.

Based upon the results shown in FIG. 5, pigmentation data is correlated to stain removal in that lower average pigmentation level corresponds to greater stain removal as can be observed by comparing the Pigmentation Average Level of Example 1 to FIG. 4d, Example 2 to FIG. 4e, and Example 3 to FIG. 4f. More specifically, smaller values for Pigmentation Average Level correspond to better stain removal, as Pigmentation Average Level is a measurement of stain concentration.

Stain removal index (SRI) values, which are used to calculate percent change as a measure of stain removal, were calculated in accordance with ASTM D4265-14, where the calculation is:

$$SRI = 100 * \frac{\Delta E*(US - UF) - \Delta E*(WS - UF)}{\Delta E*(US - UF)}$$

where:
SRI stands for stain removal index;
US=unwashed stain (i.e. fresh stain on fabric before laundering);
UF=unwashed fabric (i.e. unstained virgin fabric);
WS=Washed Stain (i.e. stained fabric after laundering).

The SRI values for Examples 1-3 are shown in TABLE I.

TABLE I

|  | SRI Index |
| --- | --- |
| Example 1 | 91.45 |
| Example 2 | 89.11 |
| Example 3 | 70.29 |

For SRI, higher values correspond to better stain removal.

FIG. 6 illustrates pigmentation average level representing an average concentration of soiling material for additional Examples 4-6, when employed Stained Fabric Sample 4, with different laundering conditions used for purposes of showing another type of stain with differences in laundering effectiveness distinguishable in accordance with the methods and systems as described herein. These Examples further demonstrate the effectiveness of the three-dimensional imaging device at analyzing a different type of oil, since the fabric was stained with canola oil in these examples. For Example 4, water alone is employed during laundering with no detergent. For Example 5, a conventional, premium laundry detergent was used during laundering. For Example 6, a conventional, super-premium laundry detergent with enzymes was used during laundering.

The SRI values for Examples 4-6 were calculated and are shown in TABLE II.

TABLE II

|  | SRI Index |
| --- | --- |
| Example 4 | 86.17 |
| Example 5 | 63.78 |
| Example 6 | 44.37 |

While specific analysis protocols are described above, the data should be recognized not for the actual values and results presented but for the fact that such quality results can be obtained using the Antera 3D® camera for purposes of analyzing the stained fabric articles.

Figure 7:
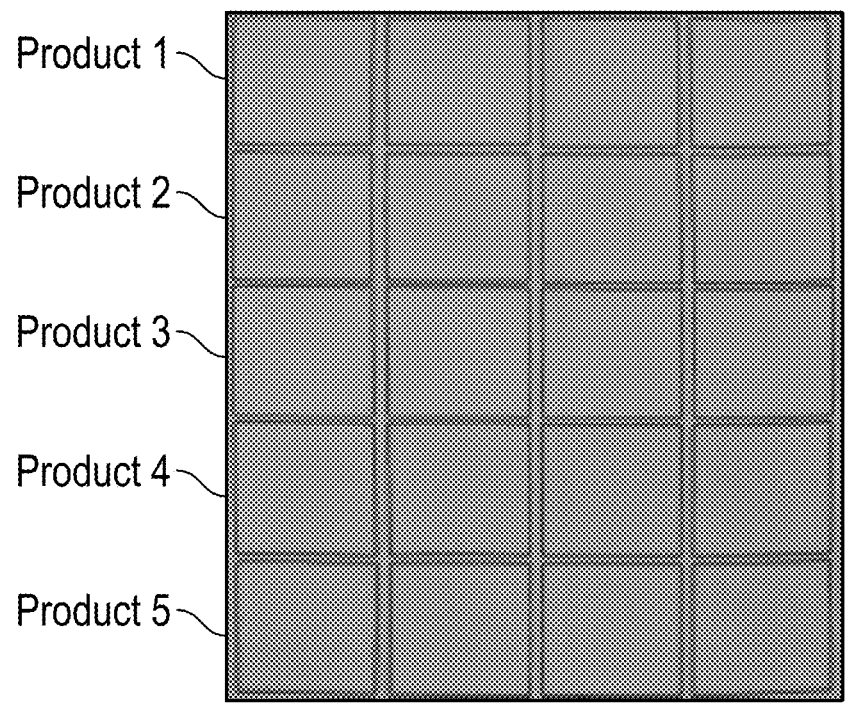
FIG. 7 is a comparative photograph of a cotton t-shirt stained with different deodorant/antiperspirant compositions prior to laundering in a desirable format for displaying marketing views, representing a view akin to the perception by the human eye and with the stains being effectively invisible.
Figure 8:
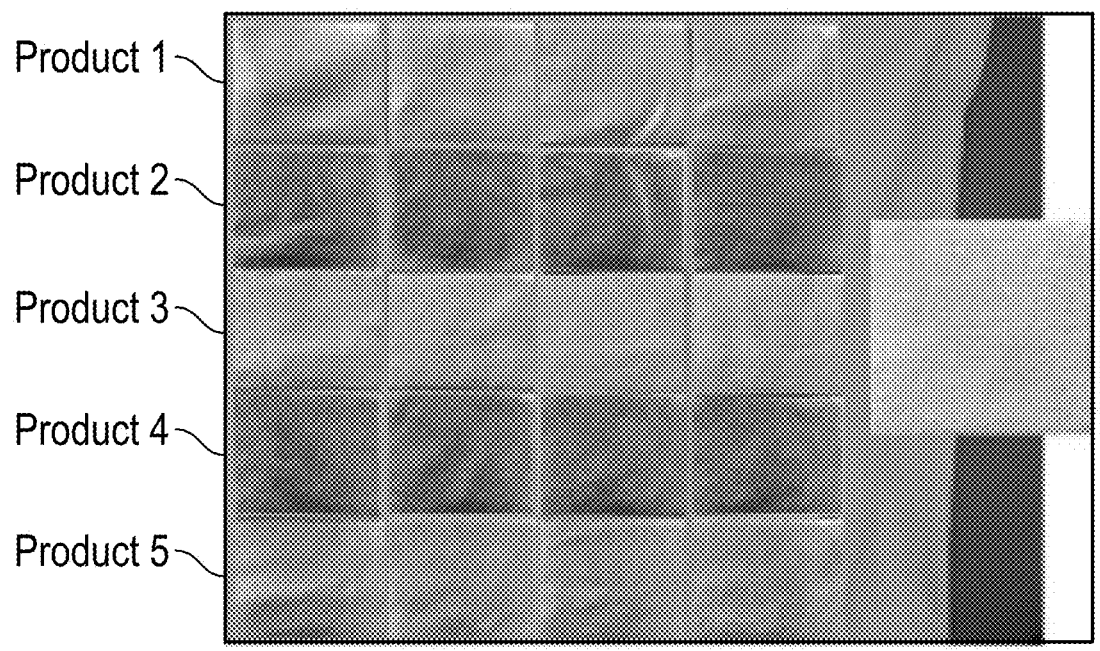
FIG. 8 is a photograph of the same areas of the stained fabric articles of FIG. 7 captured using the Antera 3D® camera and after applying the contrast function for purposes of illustrating a desirable format for displaying marketing views showing comparison of residue deposition between different deodorant/antiperspirant compositions.

Additional examples were prepared to provide images for stain visualization attributable to different consumer care products, such as deodorant/antiperspirant compositions. These examples demonstrate how different products leave behind varying levels of stain residue that is invisible to the naked eye. Referring to FIGS. 7 and 8, five different deodorant/antiperspirant compositions were applied in four different quadrants on a cotton t-shirt, with the different deodorant/antiperspirant compositions labeled as Product 1, Product 2, Product 3, Product 4, and Product 5. The examples in this instance simulate a t-shirt that may be worn and comes into contact with deodorant/antiperspirant compositions in the underarm region. These would be the kind of stains present on shirts after contact with deodorant/antiperspirant compositions present on the skin. Both FIG. 7 and FIG. 8 are photographs taken pre-laundering, with the photograph of FIG. 7 captured without applying the contrast function to the images and with FIG. 8 captured after applying the contrast function. As can be seen from comparison of FIGS. 7 and 8, images captured using the Antera 3D camera and after applying the contrast function show a clear distinction between residues from the different deodorant/antiperspirant compositions. Such images can be employed in both internal analysis and/or marketing demonstration applications. Again, the data should be recognized not for the actual results presented but for the fact that such quality images can be obtained using the Antera 3D® camera for purposes of analyzing the stained fabric articles, with the images exhibiting that differences in residue deposition between different deodorant/antiperspirant compositions can also be effectively analyzed using the Antera 3D® camera.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for analyzing stained fabric articles, wherein the method comprises:
   providing a stained fabric article including a foreign oily substance disposed in and/or on the fabric article;
   capturing a plurality of images of the stained fabric article using a three-dimensional imaging device, wherein the plurality of images are captured in the absence of a colored dye added to the foreign oily substance in and/or on the fabric article;
   processing the the plurality of images using a contrast function to produce a processed data set, wherein processing the plurality of images using the contrast function comprises generating a visual contrast between areas of high light absorbance of light and areas of low/no absorbance of light; and
   producing one or more of a processed image or a quantitative data set representative of oily substance presence in a viewing area of the three-dimensional imaging device based upon the processed data set.

2. The method of claim 1, wherein capturing the plurality of images comprises capturing the plurality of images with a different illumination direction for each of the plurality of images with a constant viewing direction.

3. The method of claim 1, further comprising filtering of electromagnetic radiation of predetermined intensity and/or wavelength prior to generating the visual contrast.

4. The method of claim 1, further comprising producing the processed image based upon the processed data set, wherein the processed image is a composite based upon the generated visual contrast.

5. The method of claim 1, further comprising producing the quantitative data set representative of oily substance presence in the viewing area of the three-dimensional imaging device based upon the processed data set.

6. The method of claim 5, wherein producing the quantitative data set comprises producing a pigmentation average level value based upon the processed data set.

7. The method of claim 1, further comprising filtering electromagnetic radiation of predetermined intensity and/or wavelength prior to generating the visual contrast.

8. The method of claim 7, wherein filtering the electromagnetic radiation of the predetermined intensity and/or wavelength comprises filtering electromagnetic radiation attributable to specular reflection.

9. The method of claim 1, further comprising laundering the stained fabric article after capturing the plurality of images of the stained fabric article to produce a laundered article.

10. The method of claim 1, wherein providing the stained fabric article comprises providing the stained fabric article with the foreign oily substance being an invisible stain that is not visible to the human eye.

11. The method of claim 1, wherein capturing the plurality of images of the stained fabric article comprises capturing the plurality of images having different spatial properties and wherein the plurality of images are of a substantially similar viewing area of the three-dimensional imaging device.

12. The method of claim 11, wherein producing one or more of the processed image or the quantitative data set comprises producing one or more of a composite image based upon the plurality of images or a quantitative data set representative of oily substance presence in a viewing area of the three-dimensional imaging device based upon the plurality of images.

13. The method of claim 12, comprising producing the composite image, wherein the composite image is produced by generating a visual contrast between areas of high light absorbance of light and areas of low/no absorbance of light, optionally with filtering of electromagnetic radiation of predetermined intensity and/or wavelength prior to generating the visual contrast.

14. The method of claim 11, wherein capturing the plurality of images comprises capturing the plurality of images with a different illumination direction for each of the plurality of images with a constant viewing direction to produce the images having different spatial properties.

15. A method for analyzing stained fabric articles, wherein the method comprises:

providing a stained fabric article including a foreign oily substance disposed in and/or on the fabric article;

capturing at least one image of the stained fabric article using a three-dimensional imaging device, wherein the at least one image is captured in the absence of a colored dye added to the foreign oily substance in and/or on the fabric article;

processing the at least one image using a contrast function to produce a processed data set and producing one or more of a processed image or a quantitative data set representative of oily substance presence in a viewing area of the three-dimensional imaging device based upon the processed data set laundering the stained fabric article after capturing the at least one image of the stained fabric article to produce a laundered article;

capturing at least one image of the laundered article using the three-dimensional imaging device;

processing the at least one image of the laundered article using the contrast function to produce a processed data set of the laundered article; and producing one or more of a processed image or a quantitative data set representative of oily substance presence in the viewing area of the three-dimensional imaging device based upon the processed data set of the laundered article.

16. The method of claim 15, further comprising displaying the processed image based upon the processed data set of the laundered article and the processed image based upon the processed data set of the stained fabric article.

17. The method of claim 15, further comprising displaying the quantitative data set based upon the processed data set of the laundered article and the quantitative data set based upon the processed data set of the stained fabric article in a common illustration.

* * * * *